United States Patent
Cho et al.

(10) Patent No.: US 7,221,513 B2
(45) Date of Patent: May 22, 2007

(54) HYBRID ACHROMATIC OPTICAL LENS AND METHOD FOR MANUFACTURING THE SAME

(75) Inventors: Eun-hyoung Cho, Kyungki-do (KR); Myung-bok Lee, Kyungki-do (KR); Jin-seung Sohn, Seoul (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 0 days.

(21) Appl. No.: 10/452,207

(22) Filed: Jun. 3, 2003

(65) Prior Publication Data

US 2004/0125452 A1 Jul. 1, 2004

(30) Foreign Application Priority Data

Dec. 31, 2002 (KR) .................... 10-2002-0087942

(51) Int. Cl.
G02B 5/18 (2006.01)
G02B 3/08 (2006.01)
G11B 7/00 (2006.01)
G11B 7/135 (2006.01)

(52) U.S. Cl. .................. 359/569; 359/742; 369/112.03

(58) Field of Classification Search ................ 359/565, 359/566, 569, 571, 576, 742; 369/112.03
See application file for complete search history.

(56) References Cited

U.S. PATENT DOCUMENTS 5,129,718 A * 7/1992 Futhey et al. ............... 351/161

(Continued)

FOREIGN PATENT DOCUMENTS

JP 2001-042212 2/2001
JP 2001-249271 9/2001
WO WO 02/069014 A1 9/2002

OTHER PUBLICATIONS

Office Action issued by the Chinese Patent Office on May 20, 2005 in corresponding application, with English translation.

(Continued)

*Primary Examiner*—Alessandro Amari
(74) *Attorney, Agent, or Firm*—Buchanan Ingersoll & Rooney PC

(57) ABSTRACT

A hybrid achromatic optical lens having a high numerical aperture whose chromatic aberration is removed and a method for manufacturing the same are provided. The hybrid achromatic optical lens includes a first optical member of a low index of refraction and a second optical member of a high index of refraction. The second optical member is formed on a depressed portion of the first optical member and has a diffractive surface, which is a contact surface of the second optical member with the first optical member and has a plurality of pitches formed on a refractive surface. The method for manufacturing the hybrid achromatic optical lens includes forming a profile of a diffractive surface having a plurality of pitches on a molding die whose one surface is the same as a profile of a refractive surface, forming a depression having the diffractive surface on a first optical member having a low index of refraction using the molding die, and coating a material having a high index of refraction on the depression, grinding a surface of material, and forming a second optical member having a high index of refraction.

22 Claims, 4 Drawing Sheets

U.S. PATENT DOCUMENTS

| | | | |
|---|---|---|---|
| 5,349,471 A | | 9/1994 | Morris et al. |
| 5,715,091 A | * | 2/1998 | Meyers .................... 359/565 |
| 5,847,877 A | * | 12/1998 | Imamura et al. ............ 359/566 |
| 5,978,159 A | * | 11/1999 | Kamo ...................... 359/793 |
| 6,366,405 B2 | * | 4/2002 | Abe ........................ 359/566 |
| 6,851,803 B2 | * | 2/2005 | Wooley et al. ............. 351/159 |

OTHER PUBLICATIONS

Notice to Submit Response issued by the Korean Patent Office on Jan. 11, 2005 in corresponding application.

* cited by examiner

HYBRID ACHROMATIC OPTICAL LENS AND METHOD FOR MANUFACTURING THE SAME

BACKGROUND OF THE INVENTION

This application claims the priority of Korean Patent Application No. 2002-87942, filed on Dec. 31, 2002, in the Korean Intellectual Property Office, the disclosure of which is incorporated herein in its entirety by reference.

1. Field of the Invention

The present invention relates to an optical lens, and more particularly, to a hybrid achromatic optical lens whose chromatic aberration is corrected in order to be used in an optical data storage system.

2. Description of the Related Art

Optical data media have evolved from compact discs (CDs) having a diameter of 12 cm and a substrate thickness of 1.1 mm to digital versatile disc (DVDs) having a diameter of 12 cm and a substrate thickness of 0.6 mm. Recently, blu-lay discs thinner than the DVDs have been developed. In order to keep pace with the advancements of optical data media, optical data storage systems for recording data on the optical data media and reproducing the recorded data have been developed so as to form a small light spot having a high energy on the optical data media and obtain a high recording density. For example, an optical data storage system for a CD uses a light source having a wavelength of 780 nm and a lens having a numerical aperture (NA) of 0.45, whereas an optical data storage system for a DVD uses a light source having a wavelength of 680 nm and a lens having a numerical aperture of 0.6.

Optical data storage systems stably record and reproduce data by automatically adjusting variations in a distance between an optical data medium and a lens according to the motion of the optical data medium using a servo mechanism. However, the servo mechanism cannot compensate for a mode hopping phenomenon of a laser beam, in which the wavelength (unit: nanometer) of the laser beam is shifted according to changes in the operational temperature. In the mode hopping phenomenon, a spectrum instantaneously hops to another mode according to changes in the operational temperature. In addition, when the mode hopping phenomenon occurs, a plurality of modes overlap so that the direction of the modes instantaneously changes in a forward or a reverse direction, thereby resulting in a rapid change in the laser wavelength with the output power and generation of noise.

In order to solve the above problems, a method of using a light source emitting a laser beam having a stable frequency and a method of compensating for chromatic aberration occurring in a longitudinal direction of a frequency band of a laser beam and removing noise can be used. Here, chromatic aberration describes a situation where the wavelength of light passing through a refractive lens changes according to changes in temperature and the light is focused onto different positions in a direction of an optical axis of the light.

Generally, the light source for emitting the laser beam having the stable frequency is expensive, and thus the method of compensating for chromatic aberration using the lens is mainly used. The method of compensating for chromatic aberration includes a first method of using a lens combining a conventional convex lens and a conventional concave lens, a second method of using a gradient index (GRIN) lens whose index of refraction changes in an axis direction and/or a radial direction thereof, and a third method of using a lens combining a diffractive element and a refractive element. The first method is not suitable for the optical data storage systems because the weight and the size of the combination lens are great. The second method is disadvantageous in that the method for manufacturing the GRIN lens is complex.

FIG. 1 shows a hybrid lens 10 for compensating for chromatic aberration disclosed in U.S. Pat. No. 5,349,471. The hybrid diffractive/refractive lens 10 for use in an optical data storage system includes an optical disc substrate 14 made of transparent plastic, such as polycarbonate. The lens 10 is a piano-convex singlet having a curved surface 1 and a plano-surface 3, which is the surface opposite to the curved surface 1 and has a Fresnel zone pattern. The curved surface 1 and the plano-surface 3 are perpendicular to the optical axis of the lens 10. A refractive lens is made of a material having a high index of refraction of at least 1.65.

However, since the hybrid lens 10 shown in FIG. 1 is made of a material having a low index of refraction and a low dispersion, the weight and the size of the lens 10 are great. Further, since a diffractive surface is formed in a surface of the lens 10 opposite to a disc, the lens 10 is easily worn due to the contact with the disc and the performance of the lens 10 is also decreased due to a pollution source.

SUMMARY OF THE INVENTION

The present invention provides a hybrid achromatic optical lens having a diffractive surface and a refractive surface which remove chromatic aberration.

According to an aspect of the present invention, there is provided a hybrid achromatic optical lens comprising a first optical member having a low index of refraction; and a second optical member having a high index of refraction which is formed on a depressed portion of the first optical member and has a diffractive surface, the diffractive surface being a contact surface of the second optical member with the first optical member and having a plurality of pitches formed on a refractive surface.

According to another aspect of the present invention, there is provided a method for manufacturing a hybrid achromatic optical lens. The method comprises forming a profile of a diffractive surface having a plurality of pitches on a molding die whose one surface is the same as a profile of a refractive surface; forming a depression area having the diffractive surface on a first optical member having a low index of refraction using the molding die; and coating a material having a high index of refraction in the depression area, grinding a surface of the material, and forming a second optical member having a high index of refraction.

According to the present invention, the refractive surface has a spherical or aspheric profile.

If the refractive surface has an aspheric profile, it is preferable that the aspheric profile satisfies the following equation:

$$Z(r) = \frac{cr^2}{1 + \sqrt{1 - (1+k)c^2 r^2}} + Ar^4 + Br^6 + Cr^8 + Dr^{10}$$

where, c represents a curvature of the refractive surface, k represents a conic constant which determines the shape of the refractive surface, r represents a distance from the center axis to a surface of the second optical member, and A, B, C, and D represent 4th order, 6th order, 8th order, and 10th order aspheric coefficients.

It is preferable that the diffractive surface has a profile satisfying the following equation:

$$S(r_m) = \frac{2\pi}{\lambda_0} \sum c_n r_m^{2n}$$

$$r_m = \sqrt{2m\lambda_0 f_0 + (m\lambda_0)^2}$$

where, m represents an integer, $\lambda_0$ represents a wavelength, $f_0$ represents a focal length, and $r_m$ represents a distance from the center of the second optical member to the m-th pitch of the second optical member. As the distance from the center of the second optical member to the m-th pitch of the second optical member becomes longer, the distance of the pitch of the second optical member becomes shorter.

The first optical member is made of a material having a low index of refraction of 1.5 or less, for example, a glass plate.

The second optical member has a high index of refraction of 2.0 or more and is made of a material having a high transmittance, for example, any material selected from a group consisting of $TiO_2$, $ZrO_2$, $HfO_2$, $SrTiO_3$, $BaTiO_3$, PZT or PLZT.

It is preferable that the second optical member is formed using a sol-gel method.

Since the hybrid achromatic optical lens of the present invention includes a refraction optical member having the low index of refraction and a diffraction optical member having the high index of refraction which is formed on a depressed portion of the refraction optical member, chromatic aberration of the optical lens can be removed and the optical lens can be used as an objective lens of a micro optical data storage system. Particularly, the hybrid achromatic optical lens of the present invention can solve problems generated in designing a conventional hybrid lens used for manufacturing a micro objective lens which can transmit in a blue wavelength band used in a micro optical pickup and has a numerical aperture of 0.85 and the diameter of 1 mm.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF THE INVENTION

Hereinafter, an optical lens according to embodiments of the present invention will be described in detail with reference to the attached drawings.

Figure 1:
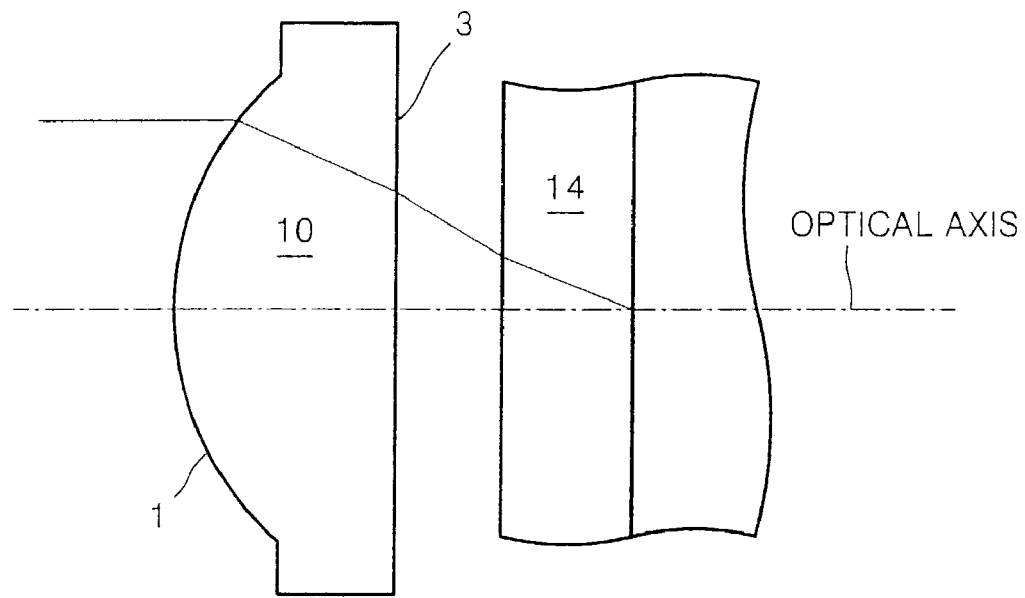
FIG. 1 is a cross-sectional view of a hybrid refractive/diffractive achromatic lens disclosed in U.S. Pat. No. 5,349,471.
Figure 2:
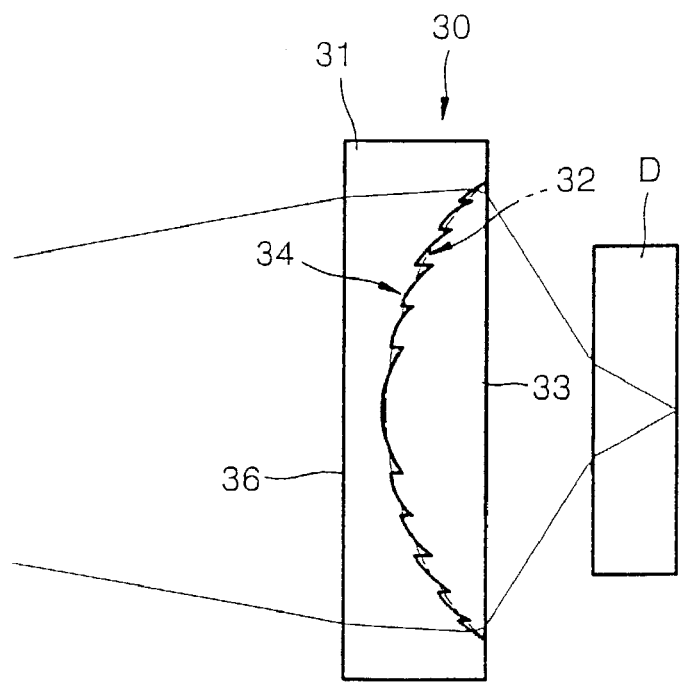
FIG. 2 is a schematic cross-sectional view of an optical lens according to an embodiment of the present invention.

Referring to FIG. 2, an optical lens 30 includes a first plate-type optical member 31 having a low index of refraction, and a second optical member 33 which is formed on a depressed portion of the first optical member 31. The second optical member 33 has a diffractive surface 34 which is a contact surface of the first optical member 31 and the second optical member 33, and the diffractive surface 34 has a plurality of concavo-convex portions which are formed on a refractive surface 32. Reference numeral 36 represents an incident surface of the first optical member 31 and D represents an optical disc.

The first optical member 31 is made of glass having a low dispersion, such as fluorite, and has a low index of refraction of 1.5 or less. The second optical member 33 is made of a material, for example, $TiO_2$, $ZrO_2$, $HfO_2$, $SrTiO_3$, $BaTiO_3$, PZT or PLZT, which has a high index of refraction of 2.0 or more and can transmit light, in a blue wavelength band, with a wavelength of about 405 nm.

Figure 3:
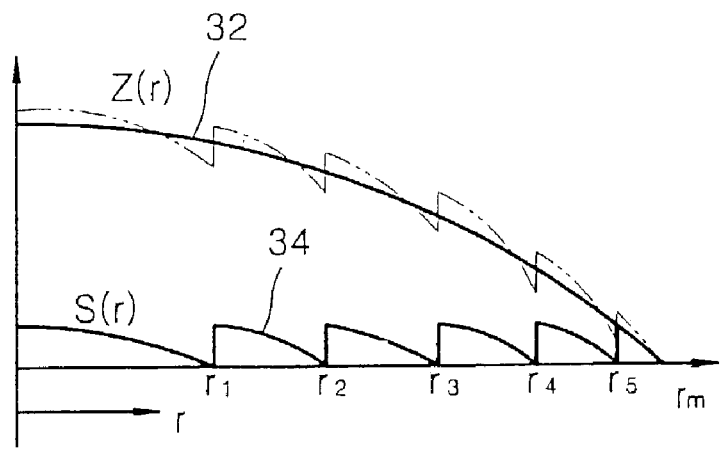
FIG. 3 is a graph of a profile of a refractive surface and a profile of a diffractive surface of the optical lens of FIG. 2.

FIG. 3 is a graph of a profile Z(r) of the refractive surface 32 and a profile S(r) of the diffractive surface 34 of the optical lens of 30 FIG. 2.

The refractive surface 32 may be a spherical or aspheric. Preferably, the refractive surface 32 is aspheric, the profile Z(r) satisfying the following Equation 1.

$$Z(r) = \frac{cr^2}{1+\sqrt{1-(1+k)c^2 r^2}} + Ar^4 + Br^6 + Cr^8 + Dr^{10} \quad (1)$$

In Equation 1, c represents a curvature of the refractive surface 32, and k represents a conic constant which determines the shape of the refractive surface 32. For example, when k ranges from −1 to 0, the refractive surface 32 is elliptical. Further, r represents a distance from the center axis of the second optical member 33 to respective surfaces of the second optical member 33, and A, B, C, and D represent the 4th order, 6th order, 8th order, and 10the order aspheric coefficients.

The diffractive surface 34 is formed along the refractive surface 32. The diffractive surface 34 has the profile $S(r_m)$ given by Equation 2.

$$S(r_m) = \frac{2\pi}{\lambda_0} \sum c_n r_m^{2n} \quad (2)$$

$$r_m = \sqrt{2m\lambda_0 f_0 + (m\lambda_0)^2}$$

In Equation 2, m represents an integer, $\lambda_0$ represents a wavelength, $f_0$ represents a focal length, and $r_m$ represents a distance from the center to the m-th pitch of the second optical member 33. Further, $c_n$ represents a coefficient for defining the shape of the diffractive surface 34 and is determined to correct the aberration of monochromatic light. It can be seen from Equation 2 that, as the distance from a center of to the pitch of the second optical member 33 becomes longer, the less the distance of the pitch of the second optical member 33 becomes smaller.

In a conventional optical system, a convex lens and a concave lens are arranged for correcting a chromatic aberration, and the index of refraction of the convex lens increases for preventing light passing through the concave lens from being dispersed. A shape and a material of the convex lens are selected suitably for increasing the index of refraction of the convex lens. However, in a case where the conventional method for correcting the chromatic aberration is used in an optical system having a high index of refraction, there is a problem in that spherical aberration, chromatic aberration, etc. of the optical lens increase. In this case, if a single layer type diffractive element is used in the optical system, the index of refraction of an optical lens can be reduced and chromatic aberration can be reduced without increasing, for example, spherical aberration. The single layer type diffractive element refers to a phase type diffraction lattice formed on a surface of an optical element. The longer the wavelength of incident light, the greater the angle of diffraction of the single layer type diffractive element. On the other hand, a refractive element has an opposite feature to the single layer type diffractive element in that, the shorter the wavelength of the incident light, the greater the angle of refraction of the refractive element. Thus, chromatic aberration can be corrected by combining the single layer type diffractive element and the refractive element.

Since an Abbe number of a conventional refractive element is larger, power of the optical system must increase greatly. However, chromatic aberration of a refractive element having a small Abbe number can be changed greatly even by slight changes in the power of the optical system, which is the reciprocal of a focal length. Thus, aberrations such as a spherical aberration and a coma aberration can be suppressed by using the optical system having the small Abbe number and reducing the power of the optical system.

When comparing a diffraction element with a general optical element based on the Abbe number, which represents the index of refraction of the wavelength of light, the absolute value of the Abbe number of the diffraction element is 3.45 and is smaller than that of the general optical element by an order of magnitude. Since the optical system is designed such that the diffraction element having the small Abbe number can correct chromatic aberration to be separated from another kind of aberration other than chromatic aberration, various types of aberrations can be corrected. The diffraction element can reduce a spherical aberration as in an aspheric lens by adjusting the distance between the pitches of the diffraction element.

Referring again to FIG. 2, if a laser beam emitted from a light source is incident on the optical lens 30, the laser beam is first refracted from the incident surface 36 of the first optical member 31 and the laser beam having a predetermined angle of refraction passes through the first optical member 31. The laser beam is again refracted from the diffractive surface 34 and forms a small light spot which is near to limitation of diffraction on the disc D. Here, the diffractive surface 34 focuses the laser beam and corrects the chromatic aberration of the optical lens 30.

FIGS. 4A through 4D schematically illustrate a method for manufacturing the optical lens of FIG. 2.

Figure 4A:
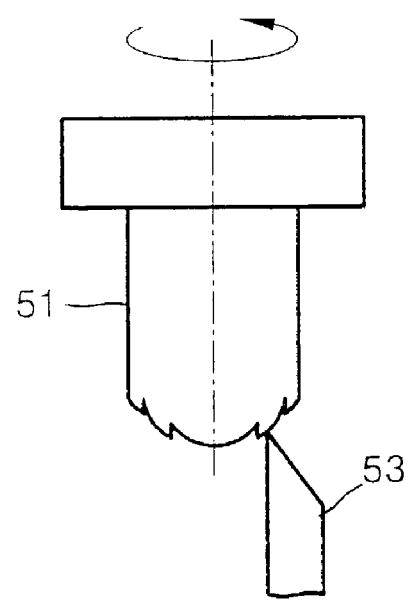
FIGS. 4A through 4D schematically illustrate a method for manufacturing the optical lens of FIG. 2.
Figure 4B:
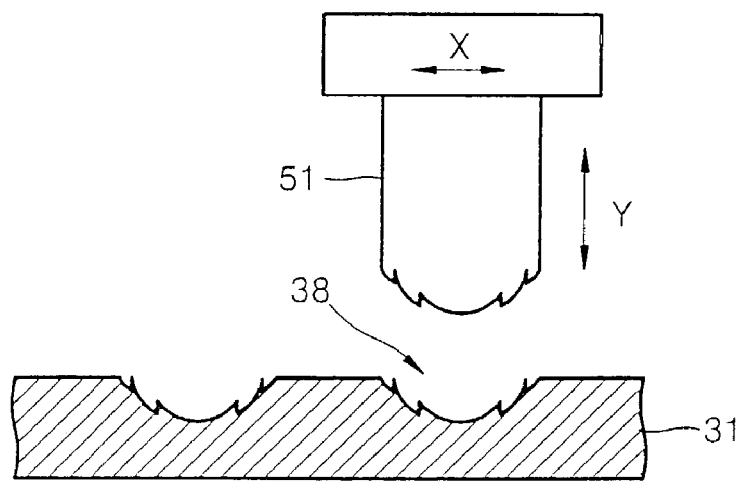

Referring now to FIG. 4A, a hard metal is prepared, and a molding die 51 is precisely manufactured using a diamond tip 53 by rotating the hard metal at a high speed. A shape of a surface of the molding die 51 is the same as the profile of the contact surface, that is, the diffractive surface 34 of the first optical member 31 and the second optical member 33 shown in FIG. 2. The molding die 51 thus formed, as shown in FIG. 4B, moves in X and Y directions, and a depression 38 is formed in the first optical member 31 due to the above motion of the molding die 51. A shape of the depression 38 is the same as the surface of the molding die 51.

Figure 4C:
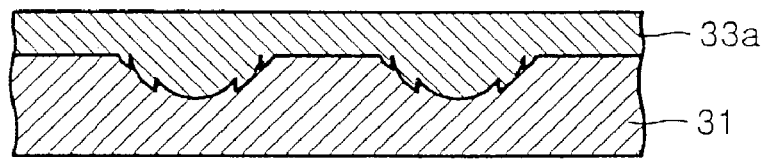
Figure 4D:
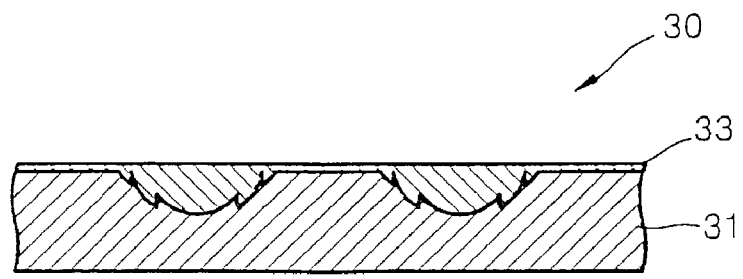

Next, as shown in FIG. 4C, a material 33a having a high index of refraction of 2.0 or more is coated on the depression 38 using a sol-gel method. The sol-gel method can form a relative even thick layer in a short time compared with a sputtering method. Since a surface of the material 33a having the high index of refraction coated on the depression 38 is not even, the surface of the material 33a is grinded using a mechanical method, thereby forming the second optical member 33 as shown in FIG. 4D. Thus, the optical lens 30 including the first optical member 31 having the low index of refraction and the second optical member 33 having the high index of refraction is obtained.

Figure 5:
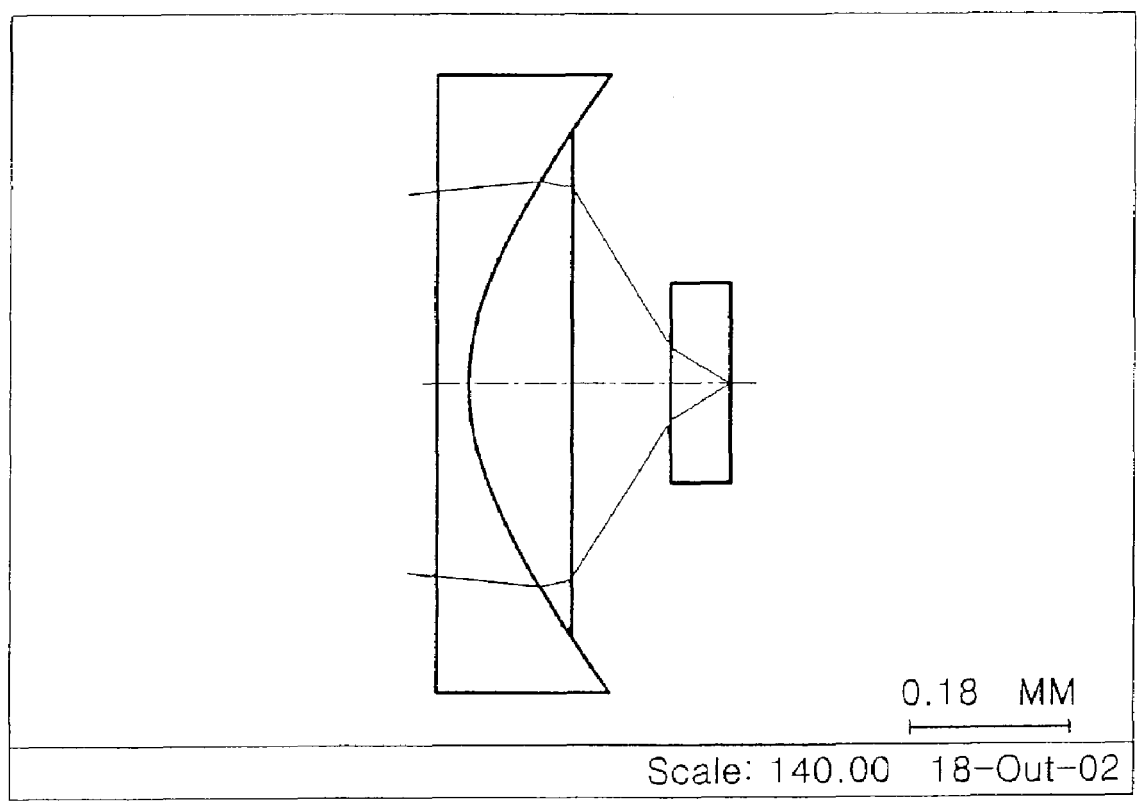
FIG. 5 illustrates a result of simulating an optical lens according to the present invention.

FIG. 5 illustrates a result of simulating an optical lens according to the present invention.

An optical lens was manufactured to have a total length of 2.73 mm, a minimum pitch of 1.966 μm, and an etching depth of 160 μm. A trade mark material NDHV310ACA was used as a laser diode and an angle of divergence of a laser beam was set to 14.7°. Under the above condition, experimental results showed that an error in a wave surface was 0.0053 $\lambda$rms (root mean square), less than a standard error of 0.025 $\lambda$rms, the diffraction efficiency was 90.84%, an allowance tolerance of decentering in a surface of the optical lens was 6 μm, greater than a standard allowance tolerance of 5 μm, and chromatic aberration was 34 nm, less than a standard value of 80 nm with respect to changes in a wavelength of 1 nm. As can be seen from the experimental results, the excellent hybrid optical lens is obtained.

As described above, since the hybrid achromatic optical lens includes a refraction optical member having the low index of refraction, the diffraction optical member having the high index of refraction is formed on a depressed portion of the refraction optical member, and a contact surface of the refraction optical member with the diffraction optical member has a predetermined profile, a small and light hybrid achromatic optical lens having high numerical aperture, excellent performance, and which reduces chromatic aberration is obtained.

Since an objective lens using the hybrid achromatic optical lens according to the present invention has a body formed on a depressed portion of a glass plate and a plate shape unlike a general objective lens formed using an injection molding method, the handling and the assembly of the objective lens is easy and a thin objective lens can be obtained. Further, when the objective lens is manufactured at a wafer level, it is easy to arrange the objective lens together with a wafer in which optical elements are mounted.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A hybrid achromatic optical lens comprising:
    a first optical member having a depressed portion and an index of refraction; and
    a second optical member having an index of refraction greater than the index of refraction of the first optical member, the second optical member being formed on the depressed portion of the first optical member and having a diffractive surface, the diffractive surface being in continuous contact with the depressed portion of the first optical member and having a plurality of pitches thereon.

2. The hybrid achromatic optical lens of claim 1, wherein the index of refraction of the first optical member is 1.5 or less.

3. The hybrid achromatic optical lens of claim 1, wherein the first optical member is a glass plate.

4. The hybrid achromatic optical lens of claim 1, wherein the first optical member is a plate type lens which has two planes and the depressed portion formed in one plane thereof.

5. The hybrid achromatic optical lens of claim 1, wherein the second optical member is formed in the depressed portion of the first optical member and has a plane surface.

6. The hybrid achromatic optical lens of claim 1, wherein the contact surface of the first optical member and the second optical member is a curved surface having a plurality of pitches.

7. A hybrid achromatic optical lens comprising:
a first optical member having a depressed portion, a refractive surface, and an index of refraction; and
a second optical member having an index of refraction greater than the index of refraction of the first optical member, the second optical member being formed on the depressed portion of the first optical member and having a diffractive surface, the diffractive surface being a contact surface of the second optical member with the first optical member and having a plurality of pitches formed thereon, wherein the refractive surface has a spherical or aspheric profile.

8. The hybrid achromatic optical lens of claim 7, wherein if the refractive surface has an aspheric profile, the aspheric profile satisfies the following equation:

$$Z(r) = \frac{cr^2}{1 + \sqrt{1 - (1+k)c^2r^2}} + Ar^4 + Br^6 + Cr^8 + Dr^{10}$$

where, c represents a curvature of the refractive surface, k represents a conic constant which determines the shape of the refractive surface, r represents a distance from the center axis to a surface of the second optical member, and A, B, C, and D represent 4th order, 6th order, 8th order, and 10th order aspheric coefficients.

9. The hybrid achromatic optical lens of claim 8, wherein the diffractive surface has a profile satisfying the following equation:

$$S(r_m) = \frac{2\pi}{\lambda_0} \sum c_n r_m^{2n}$$

$$r_m = \sqrt{2m\lambda_0 f_0 + (m\lambda_0)^2}$$

where, m represents an integer, $\lambda_0$ represents a wavelength, $f_0$ represents a focal length, and $r_m$ represents a distance from a center of the second optical member to the m-th pitch of the second optical member,
wherein, as the distance $r_m$ from the center of the second optical member to the m-th pitch of the second optical member becomes longer, the distance of the pitch of the second optical member becomes shorter.

10. A hybrid achromatic optical lens comprising:
a first optical member having a depressed portion and an index of refraction; and
a second optical member having an index of refraction greater than the index of refraction of the first optical member, the second optical member being formed on the depressed portion of the first optical member and having a diffractive surface, the diffractive surface being a contact surface of the second optical member with the first optical member and having a plurality of pitches formed thereon, wherein the second optical member is made of a material having a high transmittance and the index of refraction of the second optical member is 2.0 or more.

11. The hybrid achromatic optical lens of claim 10, wherein the second optical member is made of a material selected from a group consisting of $TiO_2$, $ZrO_2$, $HfO_2$, $SrTiO_3$, $BaTiO_3$, PZT and PLZT.

12. A hybrid achromatic optical lens comprising:
a first optical member having a concave refractive surface and an index of refraction; and
a second optical member having an index of refraction greater than the index of refraction of the first optical member, the second optical member including a diffractive surface having a plurality of pitches formed thereon and being in continuous contact with the concave refractive surface of the first optical member.

13. The hybrid achromatic optical lens of claim 12, wherein the index of refraction of the first optical member is 1.5 or less.

14. The hybrid achromatic optical lens of claim 12, wherein the first optical member is a glass plate.

15. The hybrid achromatic optical lens of claim 12, wherein the refractive surface has a spherical or aspheric profile.

16. The hybrid achromatic optical lens of claim 15, wherein if the refractive surface has an aspheric profile, the aspheric profile satisfies the following equation:

$$Z(r) = \frac{cr^2}{1 + \sqrt{1 - (1+k)c^2r^2}} + Ar^4 + Br^6 + Cr^8 + Dr^{10}$$

where, c represents a curvature of the refractive surface, k represents a conic constant which determines the shape of the refractive surface, r represents a distance from the center axis to a surface of the second optical member, and A, B, C, and D represent 4th order, 6th order, 8th order, and 10th order aspheric coefficients.

17. The hybrid achromatic optical lens of claim 16, wherein the diffractive surface has a profile satisfying the following equation:

$$S(r_m) = \frac{2\pi}{\lambda_0} \sum c_n r_m^{2n}$$

$$r_m = \sqrt{2m\lambda_0 f_0 + (m\lambda_0)^2}$$

where, m represents an integer, $\lambda_0$ represents a wavelength, $f_0$ represents a focal length, and $r_m$ represents a distance from a center of the second optical member to the m-th pitch of the second optical member,
wherein, as the distance rm from the center of the second optical member to the m-th pitch of the second optical member becomes longer, the distance of the pitch of the second optical member becomes shorter.

18. A hybrid achromatic optical lens comprising:
a first optical member having an index of refraction, a refractive surface, and a flat surface opposite to the refractive surface; and
a second optical member having an index of refraction greater than the index of refraction of the first optical member, a diffractive surface in contact with the refractive surface of the first optical member, and a flat surface opposite to the diffractive surface.

19. The hybrid achromatic optical lens of claim 18, wherein the refractive surface of the first optical member is a concave surface.

20. The hybrid achromatic optical lens of claim 18, wherein the index of refraction of the first optical member is 1.5 or less.

21. The hybrid achromatic optical lens of claim 18, wherein the refractive surface has a spherical or aspheric profile.

22. The hybrid achromatic optical lens of claim 18, wherein the diffractive surface of the second optical member includes a plurality of pitches formed thereon.

* * * * *